Figure 1:
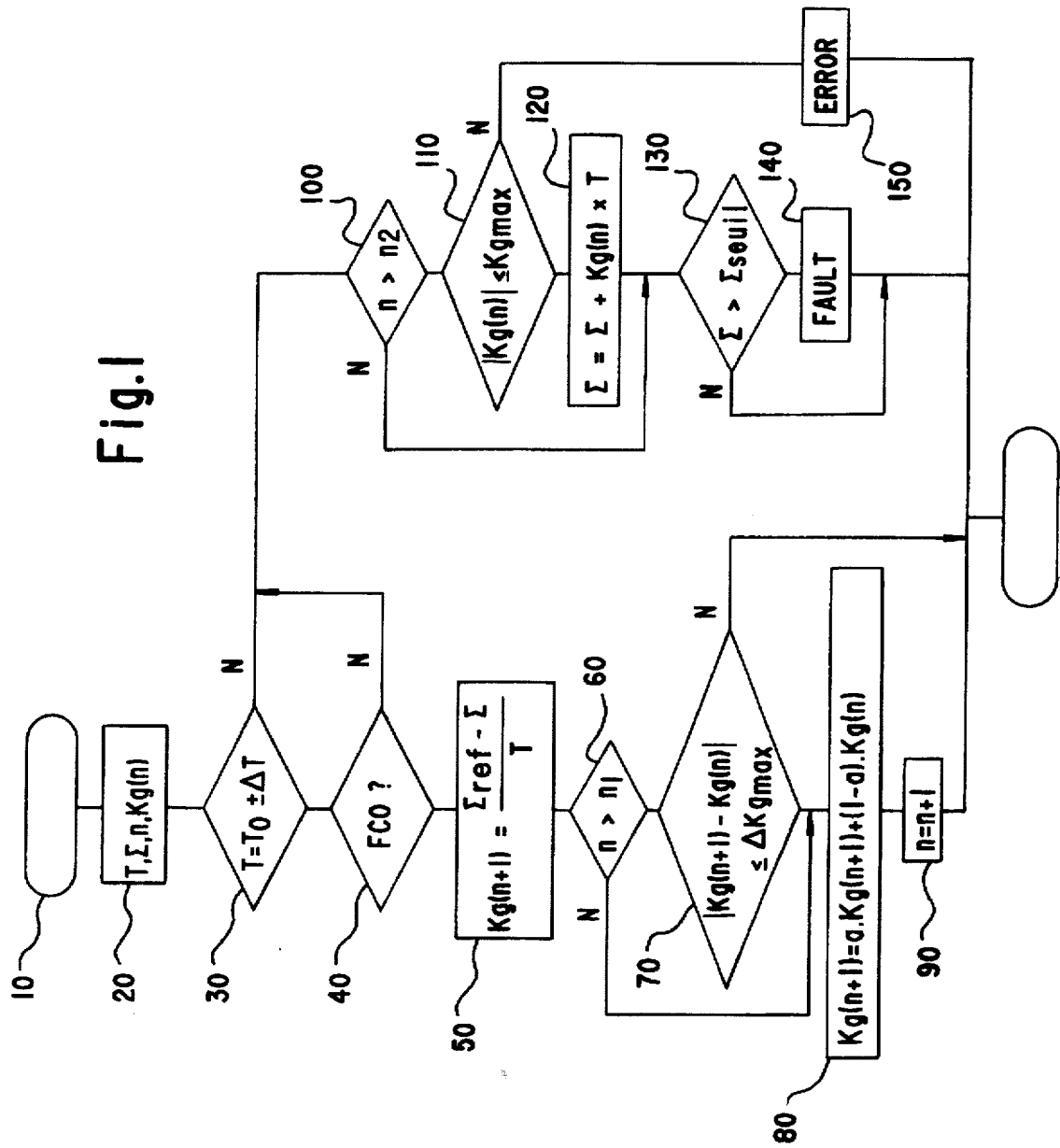

United States Patent [19]

Rossignol

[11] Patent Number: 5,708,200
[45] Date of Patent: Jan. 13, 1998

[54] METHOD FOR SENSING FAULTY COMBUSTION IN AN INTERNAL COMBUSTION ENGINE

[75] Inventor: Alain Rossignol, Toulouse, France

[73] Assignee: Siemens Automotive S.A., Toulouse Cedex, France

[21] Appl. No.: 732,356

[22] PCT Filed: Apr. 6, 1995

[86] PCT No.: PCT/EP95/01260

§ 371 Date: Oct. 15, 1996

§ 102(e) Date: Oct. 15, 1996

[87] PCT Pub. No.: WO95/27848

PCT Pub. Date: Oct. 19, 1995

[30] Foreign Application Priority Data

Apr. 12, 1994 [FR] France ................... 94 04418

[51] Int. Cl.$^6$ ................................................ G01M 15/00
[52] U.S. Cl. ................... 73/116; 73/117.3; 123/419; 123/436; 364/431.07
[58] Field of Search .................... 73/116, 117.2, 73/117.3; 123/419, 425, 436; 364/431.07, 431.08

[56] References Cited

U.S. PATENT DOCUMENTS

| | | | |
|---|---|---|---|
| 5,044,195 | 9/1991 | James et al. | 73/117.3 |
| 5,307,670 | 5/1994 | Imai et al. | 73/117.3 |
| 5,377,535 | 1/1995 | Angermaier et al. | 73/116 |
| 5,377,536 | 1/1995 | Angermaier et al. | 73/116 |
| 5,505,079 | 4/1996 | Rossignol | 73/116 |
| 5,559,705 | 9/1996 | McClish et al. | 123/419 |

FOREIGN PATENT DOCUMENTS

| | | |
|---|---|---|
| 2689934 | 10/1993 | France. |
| 2249839 | 5/1992 | United Kingdom. |
| 2269017 | 1/1994 | United Kingdom. |
| 9320427 | 10/1993 | WIPO. |

*Primary Examiner*—George M. Dombroske
*Attorney, Agent, or Firm*—Herbert L. Lerner; Laurence A. Greenberg

[57] ABSTRACT

A method for sensing faulty combustion in an internal combustion engine by calculating, for each cylinder, a critical parameter (S) representing instantaneous engine speed changes on the basis of a linear combination of time intervals between predetermined angular positions of a target secured to the crankshaft, determining whether the engine is in a combustion-free operating range and in at least one rpm range centered on a predetermined rpm value, calculating, if such is the case, a critical parameter correction coefficient (Kg(n); Kg(n+1)) relative to a reference engine on the basis of the current value of the critical parameter (S) and a reference value ($S_{ref}$) obtained under substantially identical conditions in said reference engine, and comparing the later values of the critical parameter, as corrected by the correction coefficient (Kg(n); Kg(n+1)), with a fault threshold ($S_{threshold}$) obtained experimentally in the reference engine.

7 Claims, 1 Drawing Sheet

METHOD FOR SENSING FAULTY COMBUSTION IN AN INTERNAL COMBUSTION ENGINE

The present invention relates to a process for detecting faulty combustion in an internal combustion engine, and more particularly to a process of this type which involves the measurement of time intervals between predetermined angular positions of a target linked in rotation to the engine, and which is not dependent on the geometric tolerances of this target.

A process for detecting faulty combustion in an engine is known from the prior art, and more particularly from French patent No. 2,689,934 filed by the Applicant, which is an integral part of the present description, according to which, for each cylinder, a critical parameter representing the instantaneous angular speed variation is calculated. This parameter is obtained through a linear combination of time intervals between predetermined angular positions of a target linked in rotation to the engine, in a sampling window centered on a predetermined instant in the combustion phase of the cylinder in question. This critical parameter is then compared to a fault threshold obtained experimentally in a reference engine and stored in a mapping table so that information representing a combustion error can be deduced from it. However, this process has the drawback of being dependent on the precision of the target according to which the time intervals are measured. In effect, the critical parameter is calculated on the basis of measurements performed on the target of the engine in question, and the result of this calculation is compared with a fault threshold obtained in a reference engine. Because of this, the differences in the geometry of the targets, linked for example to the tolerances of mass production or to the tolerances for mounting these targets on the engines (offset, distortion, etc.) can introduce variations which can lead to false detections of faults or to the absence of a detection of a real fault.

The problem therefore resides in rendering such a process the least sensitive possible to the variations which can exist between the targets of the various engines in the series and the reference engine in which the fault thresholds were determined.

Also known from patent application WO 93/07497 is a process for electronically correcting the tolerances of a target. In this process, a range in which the engine is driven by the vehicle is considered to be the most capable of offering maximum operational regularity. Under these conditions, the duration of each tooth of the target is measured, this duration is corrected as a function of the angular acceleration, and its ratio to the duration of the first tooth taken as a reference is determined. From this, a correction coefficient for the duration of each tooth is deduced, after filtering, as a function of the first. This coefficient is then used to correct the duration measurements performed later, for example during the calculation of the rotation speed or of the operational regularity of the engine. This process has the drawback of proposing a correction which is intrinsic to the system in question, and has no connection to a reference engine which has been used to establish the fault thresholds. Moreover, the correction coefficients obtained depend on the precision with which the first tooth is produced and can only be used in a relative way. It also appears that such a process, when applied to the correction of a target which can include several tens of teeth, very quickly becomes extremely cumbersome, resource-intensive and difficult to implement in an engine control computer. Furthermore, it can prove unsuitable for engines which have an odd number of cylinders.

The object of the present invention, therefore, is to propose a process for detecting faulty combustion which is simple to implement, suitable for any number of cylinders in the engine in question and not overly sensitive to the differences and tolerances which can exist between the targets of the reference engine and those of the various engines in the series.

These objects of the invention, as well as others which will become apparent as a result of the present description, are achieved by means of a process for detecting faulty combustion in an internal combustion engine which consists of calculating, for each cylinder, a critical parameter on the basis of a linear combination of time intervals between predetermined angular positions of a target secured to the crankshaft, and of comparing this parameter to a fault threshold obtained experimentally in a reference engine. In the process according to the invention, [a] the current value of the critical parameter is calculated for the cylinder in question, [b] it is determined whether the engine is in a combustion-free operating range and in at least one speed range centered around a predetermined speed, and if such is the case, [c] a correction coefficient for the critical parameter relative to the reference engine is calculated for the cylinder in question, independently from the predetermined speed, on the basis of the calculated current value and a reference value of the critical parameter obtained under substantially identical conditions in the reference engine.

According to one important characteristic of the present invention, the values of the critical parameter are corrected by means of the correction coefficient before they are compared to the above-mentioned fault threshold.

According to another characteristic of the invention, steps [a], [b] and [c] are repeated cyclically, and the correction coefficient is obtained by numerically filtering the values of the coefficient obtained during the preceding cycles.

Advantageously, the value of the correction coefficient obtained in each cycle is only taken into account in the calculation of the final correction coefficient if its deviation from the coefficient obtained during the preceding cycle is lower than a predetermined maximum value.

Likewise, the correction coefficient is only used to correct the values of the critical parameter if the number of cycles carried out is greater than a predetermined value.

According to another advantageous characteristic of the invention, the combustion-free operating range of the engine is determined in step [b] by the appearance of a fuel cutoff condition in deceleration.

Other characteristics and advantages of the process according to the invention will become apparent through a reading of the following description and an examination of the appended drawing, in which FIG. 1 represents a logic diagram of the process according to the invention.

The following description assumes a familiarity with French patent application 2 689 934, which describes the calculation of a critical parameter (S) representing a variation of the instantaneous speed of the engine at the moment of combustion in a given cylinder. In order to calculate this critical parameter, for each cylinder, a sampling window centered around a reference position is defined and a linear combination of the values of the time interval measurements distributed angularly on either side of the reference position is performed. Refer now to FIG. 1, which represents an example of the process according to the invention. In step 10, it is assumed that, for the cylinder in question, the calculation of the current value of the critical parameter S has been executed, along with the measurements currently used in the known systems for controlling internal combustion engines, such as the speed measurement obtained from the rotation period T. In step 20, the values obtained for the critical parameter and the rotation period are extracted from memory, along with the correction coefficient Kg(n) calculated during a preceding cycle in the execution of the process and the number n of cycles carried out. During the first execution of the process for the cylinder in question, these last two parameters have an initial null value. In step 30, it is determined whether the engine is within a speed range centered around a predetermined speed, by comparing the rotation period T to a range of periods with a width 2DT around a given period $T_0$ which correspond, for example, to 2,000 revolutions per minute plus or minus 50 revolutions per minute. If this test is positive, it is then determined, in step 40, whether the engine is in a combustion-free operating range. It may be chosen, for example, to verify the presence of a fuel cutoff condition in deceleration (FCO). Such a condition, well known in the field of engine control, is characterized by the interruption of fuel delivery to the cylinders of the engine, which results in an absence of combustion in the cylinders. This state is particularly advantageous because it makes it possible to ensure that no variation tied to combustion in the cylinder in question is taken into account in the current value of the critical parameter S. Thus, it is possible to avoid certain drawbacks of the prior art, which recommends that the engine be driven by the vehicle in order to obtain maximum operational regularity. In fact, even in this case, variations in the rotation speed of the engine can be caused by faulty combustion. The combination of tests carried out in steps 30 and 40 thus makes it possible to have a value of S which is substantially constant and which essentially depends on the geometry of the target in relation to which the measurements of the time intervals are carried out.

If the test carried out in step 40 is positive, the process then proceeds, in step 50, to the calculation of a correction coefficient Kg(n+1) of the parameter S relative to the reference engine. To this end, it extracts from suitable storage means a reference value $S_{ref}$ to which the current value of the parameter S obtained previously is compared. The reference value $S_{ref}$ is a constant obtained for example by calculating, according to the same formula and for the predetermined speed corresponding to the period $T_0$, the critical parameter S for a reference engine. This same engine is used, during adjustment tests, to determine the fault thresholds $S_{threshold}$ used to diagnose faulty combustion. It is possible, for example, to drive this reference engine by means of an electric motor at stabilized speed of 2,000 rpm, to calculate the parameter S a large number of times and determine the average of these calculations, which will be stored as a reference value $S_{ref}$ for all the engines in the series. The correction coefficient Kg(n+1) in step 50 can be obtained simply by determining the difference between the reference value $S_{ref}$ and the current value of the parameter S, and by reducing this difference, which is homogeneous with a time, to a coefficient without dimension by dividing it by the value of the rotation period of the engine. From that point on, a correction coefficient is available which is independent of the predetermined speed at which it was established, and it can be used to correct the differences in geometry, for the cylinder in question, between the target of the reference engine and that of the engine in question, as will be seen below in connection with steps 120 through 140 of the process. However, in order to refine the correction, the process proceeds to a numerical filtering of the correction coefficient. In step 60, it verifies that the number n of cycles carried out is greater than a first threshold $n_1$. If this is the case, it verifies in step 70 that the difference between the correction coefficients Kg(n+1) just calculated and Kg(n) established in the preceding cycle is less than or equal to a predetermined maximum value $DKg_{max}$, in order to eliminate any aberrant instantaneous values of Kg(n+1). Since this verification is not significant in the first execution cycles of the process, it is skipped if the test in step 60 is negative. If the test in step 70 reveals that the value of the coefficient Kg(n+1) is consistent, the process proceeds in step 80 to the numerical filtering by means of the formula $$Kg(n+1)=a \cdot Kg(n+1)+(1-a) \cdot Kg(n)$$

in which a is a filtering coefficient between 0 and 1 used to weight the influence of the last correction coefficient obtained relative to the preceding coefficients. In step 90, the cycle carried out is validated by incrementing the value of the number of cycles n, and the value of the correction coefficient obtained in the preceding step in the form Kg(n) is stored for utilization in subsequent cycles. If the test in step 70 reveals an aberrant value of the coefficient Kg(n+1), the numerical filtering is not carried out, the cycle is not validated, and the values of the number of cycles and the correction coefficient Kg(n) remain unchanged.

The sequence of the process when either of the two tests carried out in steps 30 and 40 is negative will now be examined. In this case, the conditions for validity of the calculation of the correction coefficient are not verified, and the process proceeds to a detection of faulty combustion. In order to do this, the current value of the critical parameter S calculated in step 10 is corrected by means of the correction coefficient Kg(n) calculated during a preceding cycle and extracted from memory in step 20. This correction coefficient is only presumed to be valid if the number of cycles n which led to a valid calculation of the coefficient is greater than a predetermined value $n_2$, which is verified by the test in step 100. If this test is negative, the process skips to step 130, and no correction of the critical parameter S is carried out. If the number of cycles n is sufficient, the plausibility of the correction coefficient Kg(n) is verified by comparing its absolute value to a predetermined maximum value $Kg_{max}$, during step 110. If this test is positive, the process passes to step 120 in which the correction of the value of the critical parameter S is executed by the formula $S=S+Kg(n)\times T$, in which T is the rotation period of the engine during the calculation of S.

The process then proceeds to steps 130 and possibly 140 in which, in a way that is known, for example from French patent application 2 689 934, the detection of faulty combustion is carried out by comparing the critical parameter S to a fault threshold $S_{threshold}$.

It is noted here that no matter what the speed (respectively the rotation period) of the engine during the calculation of the critical parameter S, a single correction coefficient per cylinder, which is obtained at a predetermined speed but which is only dependent on the difference in geometry between the targets of the engine in question and the reference engine, is enough to render the process for detecting faulty combustion insensitive to this difference.

If the test in step 110 is not verified, the correction coefficient Kg(n) is considered to be invalid and is not used to correct the critical parameter. Moreover, as in the example described, it can be considered to reveal an equipment failure, for example a target which is out-of-tolerance. An error signal is then generated and the steps for detecting faulty combustion are not carried out.

The process described is successively applied to each cylinder of the engine, thus making it possible to define a correction coefficient and a number of cycles carried out associated with each cylinder, respectively. However, when the engine has an even number of cylinders and when, as in a four-stroke cycle, two or more of the cylinders are associated with the same angular position of the target, it is advantageously possible to calculate only one correction coefficient per group of associated cylinders.

Furthermore, the process according to the invention has been described in the case in which it is repeated cyclically, for example at each top dead center of the cylinder in question. It would be possible, without going outside the scope of the invention, to execute the calculation of the correction coefficient only once or only a limited number of times, or only to authorize it cyclically, for example by introducing appropriate tests before step 30.

I claim:

1. An improved method of detecting faulty combustion in an internal combustion engine of the type having a plurality of cylinders and a crankshaft carrying a target, wherein a current value of a critical parameter is calculated for each cylinder of the internal combustion engine, on the basis of a linear combination of time intervals between predetermined angular positions of the target; and the critical parameter is compared to a fault threshold obtained experimentally in a reference engine; the improvement which comprises:

calculating a current value of the critical parameter for a respective cylinder;

determining whether the engine is in a combustion-free operating state and within a speed range centered around a predetermined speed;

if the engine is determined to be in the combustion-free operating state and within the given speed range in the determining step, calculating a correction coefficient for the critical parameter relative to the reference engine for the respective cylinder, independently of the predetermined speed, on the basis of the current value of the critical parameter and a reference value obtained under substantially identical conditions in the reference engine; and correcting the values of the critical parameter with the correction coefficient prior to comparing the critical parameter with the fault threshold, and the correcting step being performed with the correction coefficient for all engine speeds at which the critical parameter is calculated.

2. The method according to claim 1, wherein the correcting coefficient is the result of geometric differences between the internal combustion engine and the reference engine.

3. The method according to claim 1, which comprises cyclically repeating the calculating and determining steps and forming the correction coefficient by numerically filtering the values of the coefficients obtained during respectively preceding cycles.

4. The method according to claim 3, which comprises comparing each new correction coefficient with a correction coefficient obtained during a directly preceding cycle, and taking the new correction coefficient into account in calculating the final correction coefficient only if a deviation thereof from the coefficient obtained during the preceding cycle is less than a predetermined maximum value.

5. The method according to claim 3, which comprises correcting the values of the critical parameter with the correction coefficient only if a number of cycles carried out exceeds a predetermined number.

6. The method according to claim 3, which comprises correcting the values of the critical parameter only if an absolute value of the correction coefficient is less than a predetermined maximum value.

7. The method according to claim 1, wherein the determining step comprises determining the combustion-free operating state of the engine when a fuel supply is cut off during a deceleration phase.

* * * * *

UNITED STATES PATENT AND TRADEMARK OFFICE
CERTIFICATE OF CORRECTION

PATENT NO. : 5,708,200
DATED : January 13, 1998
INVENTOR(S) : Alain Rossignol

It is certified that error appears in the above-identified patent and that said Letters Patent is hereby corrected as shown below:

In the Abstract:
Lines 3 and 12, "S" should read -- $\Sigma$ --
Line 12, "$S_{ref}$" should read -- $\Sigma_{ref}$ --
Line 16, "$S_{threshold}$" should read -- $\Sigma_{threshold}$ --

Column 2:
Line 56, "(S)" should read -- ($\Sigma$) --
Line 66, "S" should read -- $\Sigma$ --

UNITED STATES PATENT AND TRADEMARK OFFICE
CERTIFICATE OF CORRECTION

PATENT NO. : 5,708,200
DATED : January 13, 1998
INVENTOR(S) : Alain Rossignol

It is certified that error appears in the above-identified patent and that said Letters Patent is hereby corrected as shown below:

Column 3:
Lines 26, 32, 38, 41, 45, 50, 55, "S" should read -- $\Sigma$ --
Lines 40, 42, 52, 55, "$S_{ref}$" should read -- $\Sigma_{ref}$ --
Line 46, "$S_{threshold}$" should read -- $\Sigma_{threshold}$ --

Column 4:
Lines 29, 37, 43, 45, 49, 53, "S" should read -- $\Sigma$ --
Line 50, "$S_{threshold}$" should read -- $\Sigma_{threshold}$ --
Line 43, "S=S+Kg(n)xT" should read -- $\Sigma=\Sigma+Kg(n)xT$ --

Signed and Sealed this

First Day of September, 1998

Attest:

Attesting Officer

BRUCE LEHMAN

Commissioner of Patents and Trademarks